United States Patent
Yang

(10) Patent No.: US 11,798,756 B2
(45) Date of Patent: Oct. 24, 2023

(54) SOLID-STATE CIRCUIT BREAKER TRIPS AN AIR GAP ACTUATOR AND SOLID-STATE SWITCHING COMPONENTS AT THE SAME TIME OR THE SOLID-STATE SWITCHING COMPONENTS WITH A DELAY

(71) Applicant: Siemens Industry, Inc., Alpharetta, GA (US)

(72) Inventor: Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 17/648,204

(22) Filed: Jan. 18, 2022

(65) Prior Publication Data

US 2023/0230783 A1 Jul. 20, 2023

(51) Int. Cl.
*H01H 9/54* (2006.01)
*H02H 3/42* (2006.01)
*H01H 71/12* (2006.01)

(52) U.S. Cl.
CPC ............ *H01H 9/54* (2013.01); *H01H 71/123* (2013.01); *H02H 3/42* (2013.01)

(58) Field of Classification Search
CPC .......... H02H 3/093; H02H 3/08; H02H 3/087; H02H 3/0935; H02H 3/006; H02H 3/021; H02H 3/044; H02H 3/20; H02H 3/44; H02H 3/105; H02H 3/06; H02H 3/025; H02H 3/04; H02H 3/05; H02H 3/10; H02H 7/268; H02H 7/12; H02H 7/28; H02H 7/30; H02H 7/26
See application file for complete search history.

(56) References Cited

U.S. PATENT DOCUMENTS

| | | | |
|---|---|---|---|
| 5,164,872 A | 11/1992 | Howell | |
| 2002/0128748 A1* | 9/2002 | Krakovich | G05B 19/05 700/286 |
| 2011/0026185 A1* | 2/2011 | Boudet | H03K 17/6874 361/211 |
| 2017/0256934 A1* | 9/2017 | Kennedy | H02H 3/20 |
| 2021/0126447 A1 | 4/2021 | Miller et al. | |
| 2021/0234358 A1* | 7/2021 | Zhou | G01R 15/202 |

FOREIGN PATENT DOCUMENTS

EP 2777059 A1 9/2014
WO 2006119906 A1 11/2006

* cited by examiner

*Primary Examiner* — Bryan R Perez

(57) ABSTRACT

A solid-state circuit breaker (SSCB) comprises a breaker housing, line-in and line-out terminals and one or more solid state switching components. The SSCB further comprises an air gap disposed between the line-in and line-out terminals and coupled in series with the solid-state switching components to complete a current conducting path when closed. The air gap includes an air gap driving mechanism. The solid-state circuit breaker further comprises an air gap actuator to interact with the air gap driving mechanism. The SSCB further comprises a controller that controls the air gap actuator and is configured to: (a). send a tripping signal to the air gap actuator and the one or more solid state switching components at substantially the same time or (b). send a tripping signal to the air gap actuator a short amount of time earlier than sending the tripping signal to the one or more solid state switching components.

20 Claims, 4 Drawing Sheets

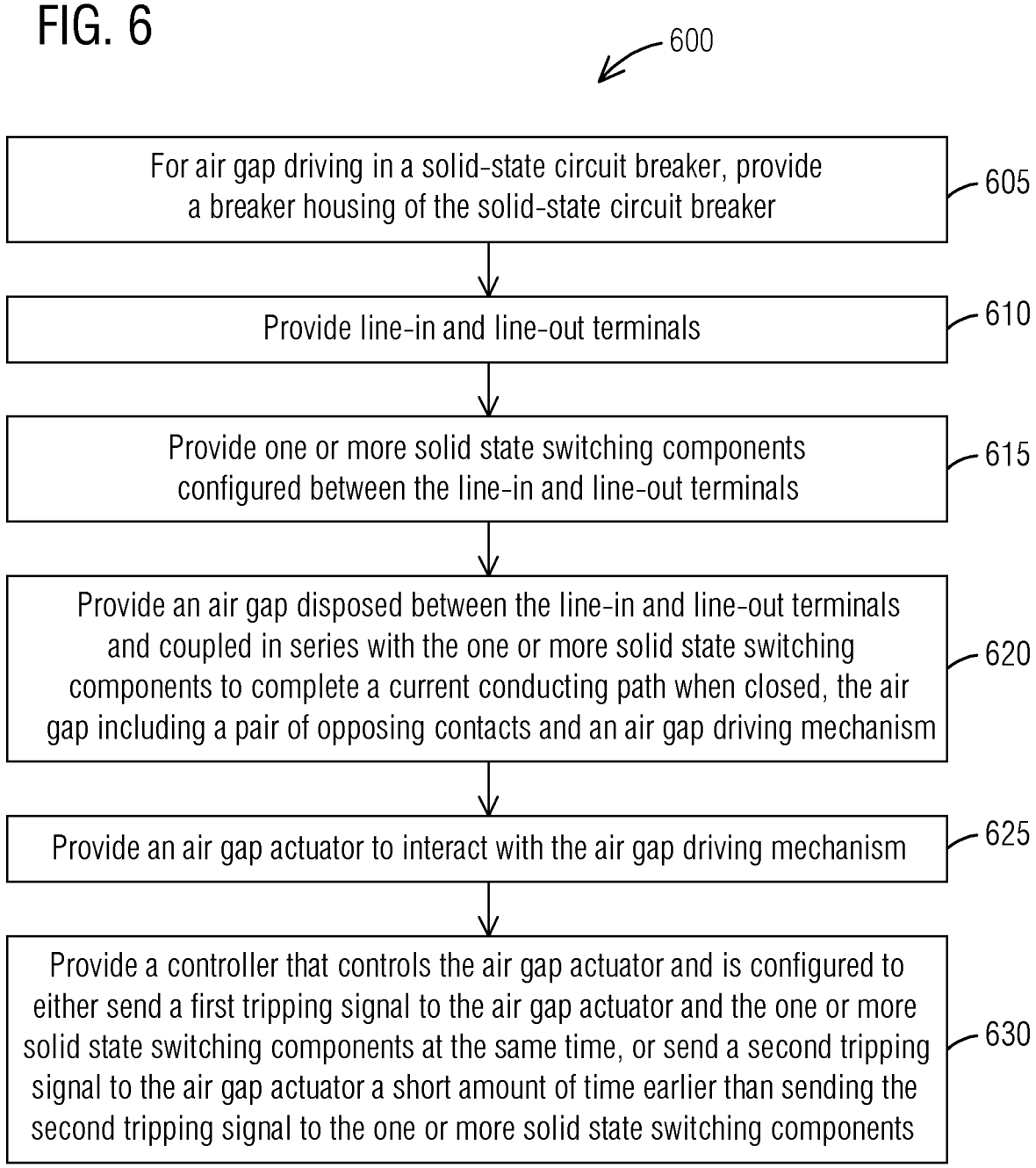

SOLID-STATE CIRCUIT BREAKER TRIPS AN AIR GAP ACTUATOR AND SOLID-STATE SWITCHING COMPONENTS AT THE SAME TIME OR THE SOLID-STATE SWITCHING COMPONENTS WITH A DELAY

BACKGROUND

1. Field

Aspects of the present invention generally relate to a solid-state circuit breaker that trips an air gap actuator and solid-state switching components at the same time or the solid-state switching components with a delay.

2. Description of the Related Art

Solid-state circuit breakers have advantages, such as fast interruption, easy integration to control circuit and so on. However, one of the drawbacks of solid-state circuit breakers is that leakage current exists even when solid-state switching components are off. An integrated air gap mechanism is normally provided to cut off the leakage current, so the breaker can achieve true off state under fault conditions. For certain types of solid-state switching devices or under certain voltage conditions, the leakage current can be high enough to discount solid-state switching components as interruption means. For example, current UL 943, the governing standard for ground fault circuit interrupter, only recognizes air gap as isolation means. Solid-state switching devices being off without air gap open cannot be considered clearing of ground fault. This is largely due to device leakage current can reach to ground fault level without air gap open. The longer the air gap stays on after solid-state switching components are off, the more possibilities to cause harm. However, it is also important to ensure solid-state components are switched off before air gap forms, otherwise arcing may happen within air gap and may reduce lifetime of the air gap mechanism. Currently, to our best knowledge, solid-state circuit breaker designs use a tripping sequence such that the controller turns off solid-state switching devices first, and after they are off, controller sends a signal to open the air gap. While assuring no arcing, there are some inherent delays in this setup that makes leakage current present longer.

Therefore, there is a need for a better solid-state circuit breaker.

SUMMARY

Briefly described, aspects of the present invention relate to a solid-state circuit breaker that trips an air gap actuator and solid-state switching components at the same time or the solid-state switching components with a delay. This invention is to use the significant timing difference of actions between solid-state switching components and air gap mechanism as natural time delay, and to reduce the time from solid-state turning off and forming of an air gap. This invention is to reduce time from solid state turning off and forming of an air gap, so the true fast interruption potential of a solid state circuit breaker can be realized. This disclosure proposes a different operating sequence of solid state switching components and an air gap to open the air gap faster.

In accordance with one illustrative embodiment of the present invention, a solid-state circuit breaker comprises a breaker housing, line-in and line-out terminals and one or more solid state switching components configured between the line-in and line-out terminals. The solid-state circuit breaker further comprises an air gap disposed between the line-in and line-out terminals and coupled in series with the one or more solid state switching components to complete a current conducting path when closed. The air gap includes a pair of opposing contacts and an air gap driving mechanism. The solid-state circuit breaker further comprises an air gap actuator to interact with the air gap driving mechanism. The solid-state circuit breaker further comprises a controller that controls the air gap actuator and is configured to: (a). send a tripping signal to the air gap actuator and the one or more solid state switching components at substantially the same time or (b). send a tripping signal to the air gap actuator a short amount of time earlier than sending the tripping signal to the one or more solid state switching components.

In accordance with one illustrative embodiment of the present invention, a method of air gap driving in a solid-state circuit breaker is provided. The method comprises providing a breaker housing, providing line-in and line-out terminals and providing one or more solid state switching components configured between the line-in and line-out terminals. The method further comprises providing an air gap disposed between the line-in and line-out terminals and coupled in series with the one or more solid state switching components to complete a current conducting path when closed. The air gap including a pair of opposing contacts and an air gap driving mechanism. The method further comprises providing an air gap actuator to interact with the air gap driving mechanism. The method further comprises providing a controller that controls the air gap actuator and is configured to: (a). send a tripping signal to the air gap actuator and the one or more solid state switching components at substantially the same time or (b). send a tripping signal to the air gap actuator a short amount of time earlier than sending the tripping signal to the one or more solid state switching components.

BRIEF DESCRIPTION OF THE DRAWINGS

FIG. 6 illustrates a schematic view of a flow chart of a method of air gap driving in a solid-state circuit breaker in accordance with an exemplary embodiment of the present invention.

DETAILED DESCRIPTION

Figure 1:
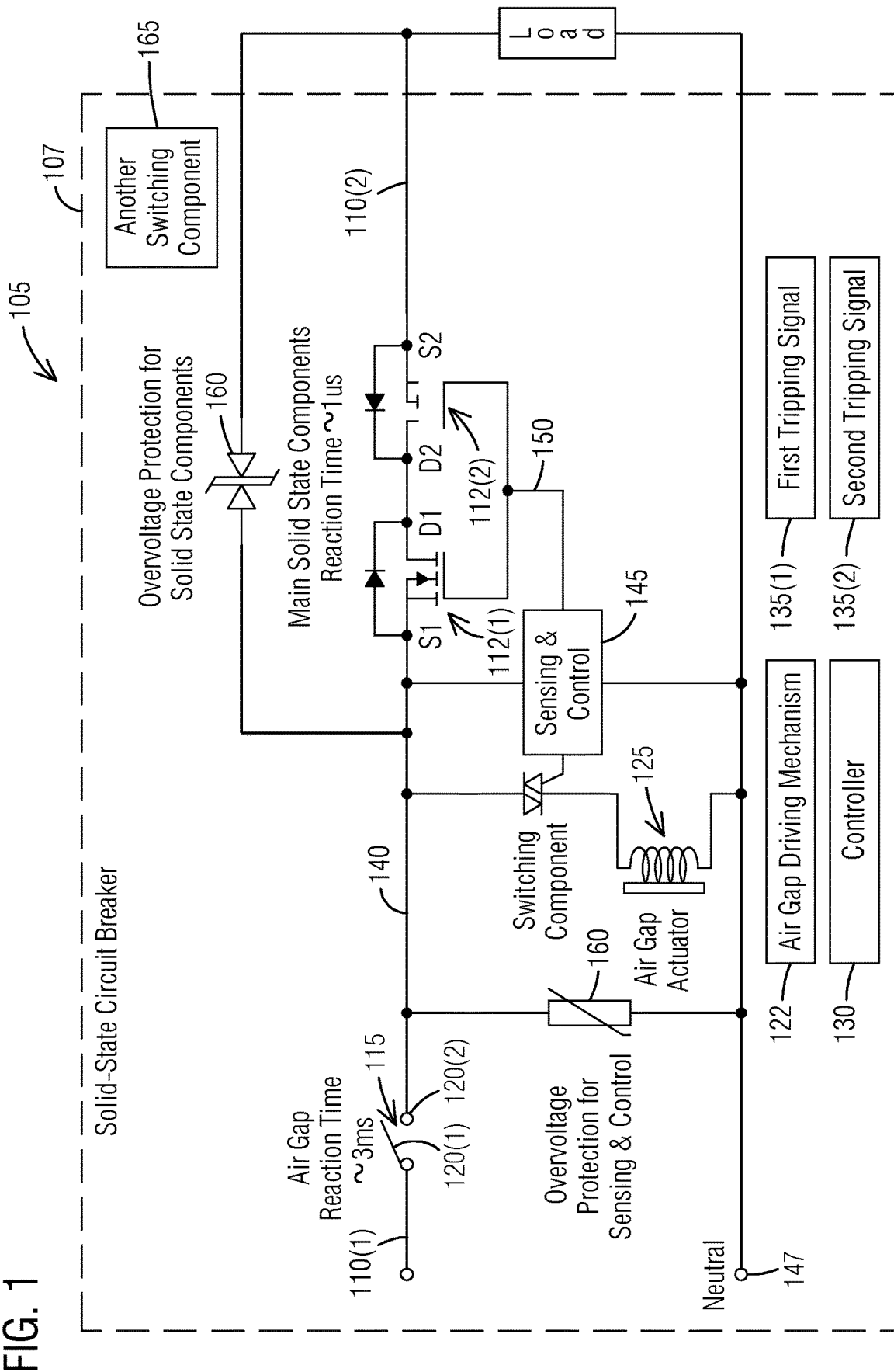
FIG. 1 illustrates a solid-state circuit breaker in accordance with an exemplary embodiment of the present invention.

To facilitate an understanding of embodiments, principles, and features of the present invention, they are explained hereinafter with reference to implementation in illustrative embodiments. In particular, they are described in the context of a solid-state circuit breaker that trips an air gap actuator and solid-state switching components at the same time or the solid-state switching components with a delay. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the solid-state circuit breaker according to the present disclosure are described below with reference to FIGS. 1-6 herein. Like reference numerals used in the drawings identify similar or identical elements throughout the several views. The drawings are not necessarily drawn to scale.

Consistent with one embodiment of the present invention, FIG. 1 represents a solid-state circuit breaker 105 in accordance with an exemplary embodiment of the present invention. The solid-state circuit breaker 105 comprises a breaker housing 107, line-in and line-out terminals 110(1-2), one or more solid state switching components 112(1-2) configured between the line-in and line-out terminals 110(1-2). The solid-state circuit breaker 105 further comprises an air gap 115 disposed between the line-in and line-out terminals 110(1-2) and coupled in series with the one or more solid state switching components 112(1-2) to complete a current conducting path when closed. The air gap 115 includes a pair of opposing contacts 120(1-2) and an air gap driving mechanism 122.

The solid-state circuit breaker 105 further comprises an air gap actuator 125 to interact with the air gap driving mechanism 122. The solid-state circuit breaker 105 further comprises a controller 130 that controls the air gap actuator 125 and is configured to either: (a). send a tripping signal 135(1) to the air gap actuator 125 and the one or more solid state switching components 112(1-2) at the same time, or (b). send a tripping signal 135(2) to the air gap actuator 125 a short amount of time earlier than sending the tripping signal 135(2) to the one or more solid state switching components 112(1-2). In one embodiment, the short amount of time is few milliseconds. The tripping signal 135(1) and the tripping signal 135(2) are a same tripping signal but represent two different scenarios.

In both cases of operation of the solid-state circuit breaker 105, the one or more solid-state switching components 112(1-2) still turn OFF first and arcing does not happen when the air gap 115 opens. The air gap 115 can open as close as less than 1 millisecond after the one or more solid-state switching components 112(1-2) are OFF. A solid-state switching component of the one or more solid-state switching components 112(1-2) is a metal—oxide—semiconductor field-effect transistor (MOSFET) or an insulated-gate bipolar transistor (IGBT) which has a short reaction time and can switch OFF quickly in the order of 1 microsecond or less after receiving a trigger signal from the controller 130.

The solid-state circuit breaker 105 further comprises a load current carrying path 140 formed by the air gap 115 being placed in series with the one or more solid-state switching components 112(1-2). The solid-state circuit breaker 105 further comprises a sensing and control circuity 145 provided across a connection point after the air gap 115 and a neutral 147 to control a gate 150 of the one or more solid-state switching components 112(1-2) and is configured to monitor a load current condition. Depending on functionalities, the controller 130 can decide to trip the solid-state circuit breaker 105 under fault conditions, such as an overload, a short circuit, a ground fault or an arc fault.

A benefit of turning on the air gap actuator 125 at the same time or earlier than the one or more solid-state switching components 112(1-2) is an additional overvoltage protection. If an air gap actuator circuit 155 is open when overvoltage happens so it can share current generated by an overvoltage and reduce wear on overvoltage protection components 160. An arrangement of the solid-state circuit breaker 105 can provide additional protection for an overvoltage generated on a line side. To provide more protection for an overvoltage generated on a load side, another actuator switching component 165 can be added to connect to the load side.

Figure 4:
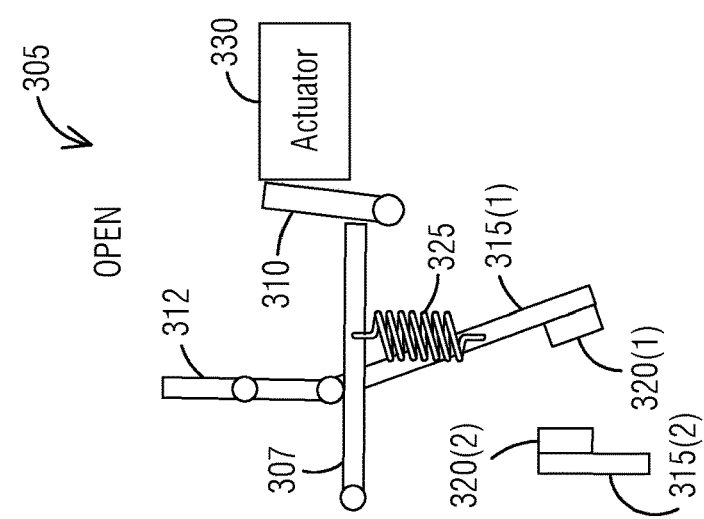
FIGS. 2-4 illustrate a 3-bar mechanism of an air gap mechanism in accordance with an exemplary embodiment of the present invention.
Figure 3:
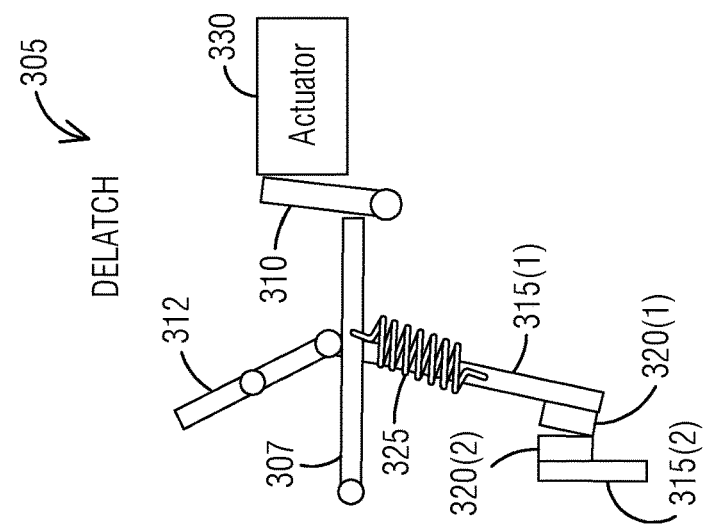
Figure 2:
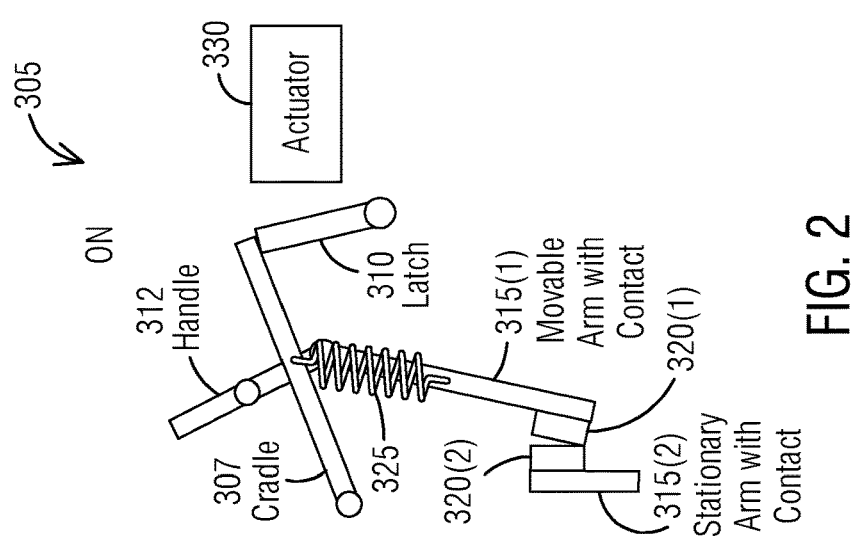

Referring to FIGS. 2-4, they illustrate a 3-bar mechanism of an air gap mechanism 305 in accordance with an exemplary embodiment of the present invention. FIG. 2 illustrates an ON operation of the air gap mechanism 305. FIG. 3 illustrates a DELATCH operation of the air gap mechanism 305. FIG. 4 illustrates an OPEN operation of the air gap mechanism 305.

Referring to FIG. 2, it illustrates an ON operation of the air gap mechanism 305. In FIG. 2, the air gap mechanism 305 comprises a cradle 307 and a latch 310. The air gap mechanism 305 further comprises a handle 312 connected to a movable arm 315(1) with a first contact 320(1). The movable arm 315(1) faces a stationary arm 315(2) with a second contact 320(2). The air gap mechanism 305 further comprises an operating spring 325 connected between the cradle 307 and the movable arm 315(1). For clarity purpose, a latch reset spring and motion stops for parts are not shown. For the ON operation, the operating spring 325 holds the first contact 320(1) and the second contact 320(2) together.

Turning now to FIG. 3, it illustrates a DELATCH operation of the air gap mechanism 305. In FIG. 3, an air gap actuator 330 draws the latch 310 and releases the cradle 307 to fall. Once the spring end on the cradle 307 falls pass a contact arm pivot, a contact arm rotates to open. Time delay before contacts start to separate due to a time needed for the actuator 330 to raise high enough current, a time for armature to rotate, a time for the cradle 307 to fall.

FIG. 4 illustrates an OPEN operation of the air gap mechanism 305. A contact arm (i.e., the movable arm 315(1)) opens to an open position to form an air gap.

Figure 5:
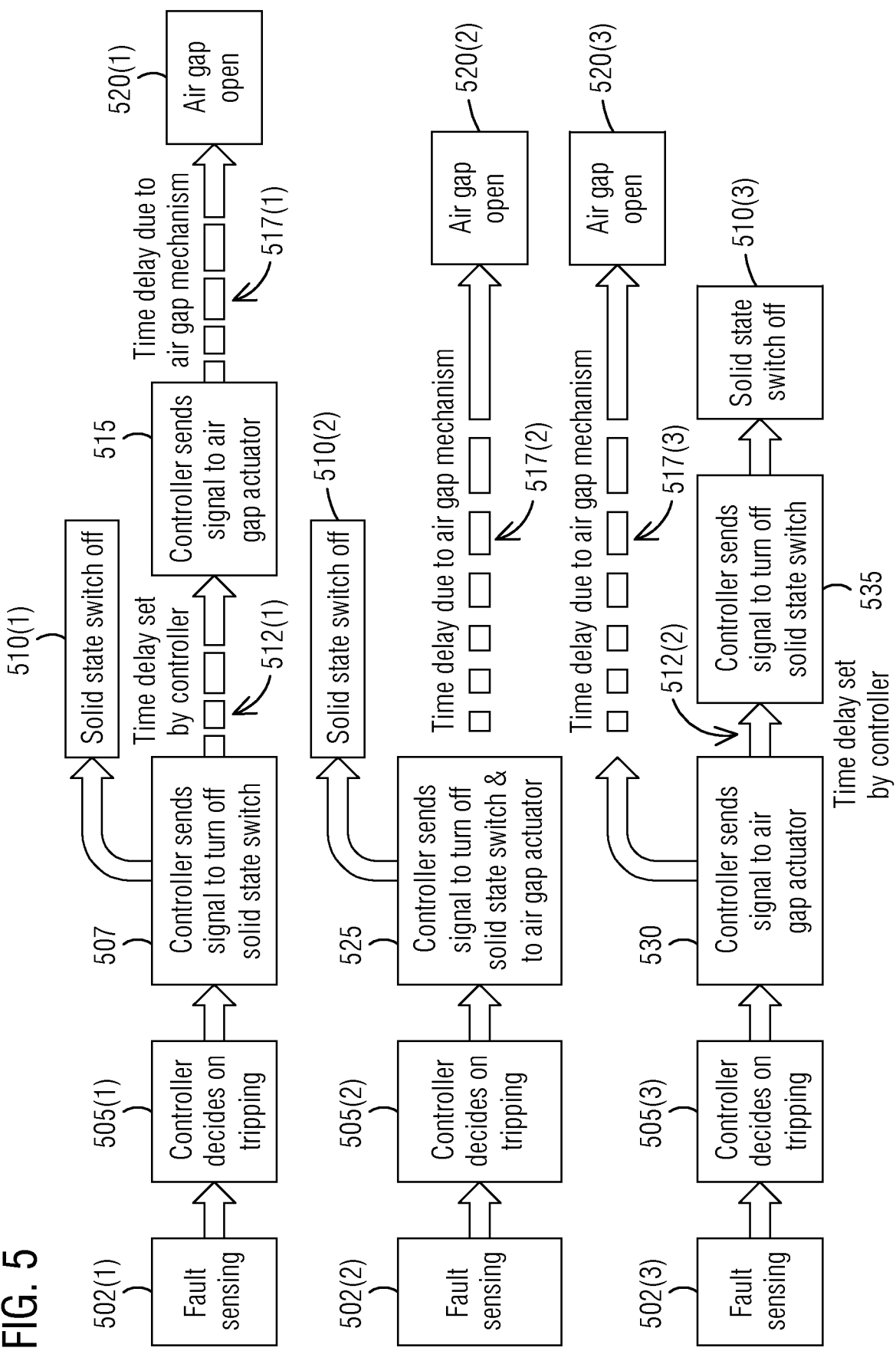
FIG. 5 illustrates some timeline illustrations of tripping sequences in accordance with an exemplary embodiment of the present invention.

As seen in FIG. 5, it illustrates some timeline illustrations of tripping sequences of the solid-state circuit breaker 105 in accordance with an exemplary embodiment of the present invention. Upon a fault sensing in step 502(1), the controller 130 decides on tripping in step 505(1). The controller 130 sends a signal to turn off a solid-state switch of the one or more solid-state switching components 112(1-2) in step 507. The solid-state switch is turned off in step 510(1). After a time delay set by the controller 130 in step 512(1), the controller 130 sends a signal to the air gap actuator 125 in step 515. After a time delay due to the air gap driving mechanism 122 in step 517(1), the air gap 115 opens in step 520(1).

Upon a fault sensing in step 502(2), the controller 130 decides on tripping in step 505(2). The controller 130 sends a signal to turn off a solid-state switch of the one or more solid-state switching components 112(1-2) and to the air gap actuator 125 in step 525. The solid-state switch is turned off in step 510(2). After a time delay due to the air gap driving mechanism 122 in step 517(2), the air gap 115 opens in step 520(2).

Upon a fault sensing in step 502(3), the controller 130 decides on tripping in step 505(3). The controller 130 sends a signal to the air gap actuator 125 in step 530. After a time delay due to the air gap driving mechanism 122 in step 517(3), the air gap 115 opens in step 520(3). After a time delay set by the controller 130 in step 512(2), the controller 130 sends a signal to turn off solid state switch in step 535. The solid-state switch is turned off in step 510(3).

As shown in FIG. 6, it illustrates a schematic view of a flow chart of a method of air gap driving in a solid-state circuit breaker in accordance with an exemplary embodiment of the present invention. Reference is made to the elements and features described in FIGS. 1-5. It should be appreciated that some steps are not required to be performed in any particular order, and that some steps are optional.

The method 600 comprises a step 605 of providing a breaker housing. The method 600 further comprises a step 610 of providing line-in and line-out terminals. The method 600 further comprises a step 615 of providing one or more solid state switching components configured between the line-in and line-out terminals.

The method 600 further comprises a step 620 of providing an air gap disposed between the line-in and line-out terminals and coupled in series with the one or more solid state switching components to complete a current conducting path when closed. The air gap including a pair of opposing contacts and an air gap driving mechanism. The method 600 further comprises a step 625 of providing an air gap actuator to interact with the air gap driving mechanism. The method 600 further comprises a step 630 of providing a controller that controls the air gap actuator and is configured to either send a first tripping signal to the air gap actuator and the one or more solid state switching components at the same time, or send a second tripping signal to the air gap actuator a short amount of time earlier than sending the second tripping signal to the one or more solid state switching components. The first tripping signal and the second tripping signal are a same tripping signal but represent two different scenarios.

While a 3-bar mechanism of an air gap mechanism is described here a range of one or more other air gap mechanisms are also contemplated by the present invention. For example, other air gap mechanisms may be implemented based on one or more features presented above without deviating from the spirit of the present invention.

The techniques described herein can be particularly useful for a different operating sequence of solid-state switching components and an air gap to open the air gap faster. While particular embodiments are described in terms of two operating sequences, the techniques described herein are not limited to such operating sequences but can also be used with other operating sequences.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A solid-state circuit breaker comprising:
   a breaker housing;
   line-in and line-out terminals;
   one or more solid state switching components configured between the line-in and line-out terminals;
   an air gap disposed between the line-in and line-out terminals and coupled in series with the one or more solid state switching components to complete a current conducting path when closed, the air gap including a pair of opposing contacts and an air gap driving mechanism;
   an air gap actuator to interact with the air gap driving mechanism; and
   a controller that controls the air gap actuator and is configured to:
   (a). send a tripping signal to the air gap actuator and the one or more solid state switching components at the same time
   or
   (b). send a tripping signal to the air gap actuator earlier than sending the tripping signal to the one or more solid state switching components,
   wherein the air gap can open in a first reaction time after the one or more solid-state switching components are off such that there is a different operating sequence of the one or more solid-state switching components and the air gap to open the air gap relatively faster by reducing a time from the one or more solid-state switching components turning off and forming of the air gap as the one or more solid-state switching components still turn off first and arcing does not happen when the air gap opens, and
   wherein a solid-state switching component of the one or more solid-state switching components has a reaction time such that it can switch off in a second reaction time after receiving the trigger signal from the controller, wherein the second reaction time is substantially smaller than the first reaction time.

2. The solid-state circuit breaker of claim 1, wherein, in both cases, the one or more solid-state switching components still turn off first and arcing does not happen when the air gap opens.

3. The solid-state circuit breaker of claim 2, wherein the air gap can open as close as less than 1 millisecond after the one or more solid-state switching components are off.

4. The solid-state circuit breaker of claim 1, wherein a solid-state switching component of the one or more solid-state switching components is a metal-oxide-semiconductor field-effect transistor (MOSFET) or an insulated-gate bipolar transistor (IGBT) which has a reaction time and can switch off in about 1 microsecond or less after receiving the trigger signal from the controller.

5. The solid-state circuit breaker of claim 1, further comprising:
   a load current carrying path formed by the air gap being placed in series with the one or more solid-state switching components; and
   a sensing and control circuitry provided across a connection point after the air gap and a neutral to control a gate of the one or more solid-state switching components and is configured to monitor a load current condition, wherein depending on functionalities, the controller can decide to trip the solid-state circuit breaker under fault conditions, such as an overload, a short circuit, a ground fault or an arc fault.

6. The solid-state circuit breaker of claim 1, wherein a benefit of turning on the air gap actuator at the same time or earlier than the one or more solid-state switching components is an additional overvoltage protection.

7. The solid-state circuit breaker of claim 1, wherein if an air gap actuator circuit is open when overvoltage happens so it can share current generated by an overvoltage and reduce wear on overvoltage protection components.

8. The solid-state circuit breaker of claim 1, wherein an arrangement of the solid-state circuit breaker can provide additional protection for an overvoltage generated on a line side.

9. The solid-state circuit breaker of claim 1, wherein to provide more protection for an overvoltage generated on a load side, another actuator switching component can be added to connect to the load side.

10. The solid-state circuit breaker of claim 1, wherein the first reaction time is about 3 milliseconds and the second reaction time is about 1 microsecond.

11. A method of air gap driving in a solid-state circuit breaker, the method comprising:
   providing a breaker housing;
   providing line-in and line-out terminals;
   providing one or more solid state switching components configured between the line-in and line-out terminals;
   providing an air gap disposed between the line-in and line-out terminals and coupled in series with the one or more solid state switching components to complete a current conducting path when closed, the air gap including a pair of opposing contacts and an air gap driving mechanism;
   providing an air gap actuator to interact with the air gap driving mechanism; and
   providing a controller that controls the air gap actuator and is configured to:
   (a). send a tripping signal to the air gap actuator and the one or more solid state switching components at the same time or (b). send a tripping signal to the air gap actuator earlier than sending the tripping signal to the one or more solid state switching components, wherein the air gap can open in a first reaction time after the one or more solid-state switching components are off such that there is a different operating sequence of the one or more solid-state switching components and the air gap to open the air gap relatively faster by reducing a time from the one or more solid-state switching components turning off and forming of the air gap as the one or more solid-state switching components still turn off first and arcing does not happen when the air gap opens, and wherein a solid-state switching component of the one or more solid-state switching components has a reaction time such that it can switch off in a second reaction time after receiving the trigger signal from the controller, wherein the second reaction time is substantially smaller than the first reaction time.

12. The method of claim 11, wherein, in both cases, the one or more solid-state switching components still turn off first and arcing does not happen when the air gap opens.

13. The method of claim 12, wherein the air gap can open as close as less than 1 millisecond after the one or more solid-state switching components are off.

14. The method of claim 11, wherein a solid-state switching component of the one or more solid-state switching components is a metal-oxide-semiconductor field-effect transistor (MOSFET) or an insulated-gate bipolar transistor (IGBT) which has a reaction time and can switch off in about 1 microsecond or less after receiving the trigger signal from the controller.

15. The method of claim 11, further comprising:

providing a load current carrying path formed by the air gap being placed in series with the one or more solid-state switching components; and providing a sensing and control circuitry provided across a connection point after the air gap and a neutral to control a gate of the one or more solid-state switching components and is configured to monitor a load current condition, wherein depending on functionalities, the controller can decide to trip the solid-state circuit breaker under fault conditions, such as an overload, a short circuit, a ground fault or an arc fault.

16. The method of claim 11, wherein a benefit of turning on the air gap actuator at the same time or earlier than the one or more solid-state switching components is an additional overvoltage protection.

17. The method of claim 11, wherein if an air gap actuator circuit is open when overvoltage happens so it can share current generated by an overvoltage and reduce wear on overvoltage protection components.

18. The method of claim 11, wherein an arrangement of the solid-state circuit breaker can provide additional protection for an overvoltage generated on a line side.

19. The method of claim 11, wherein to provide more protection for an overvoltage generated on a load side, another actuator switching component can be added to connect to the load side.

20. The method of claim 11, wherein the first reaction time is about 3 milliseconds and the second reaction time is about 1 microsecond.

* * * * *